July 20, 1937.  T. OHMOTO  2,087,701
TENS CARRYING MECHANISM
Filed June 14, 1932  4 Sheets-Sheet 1
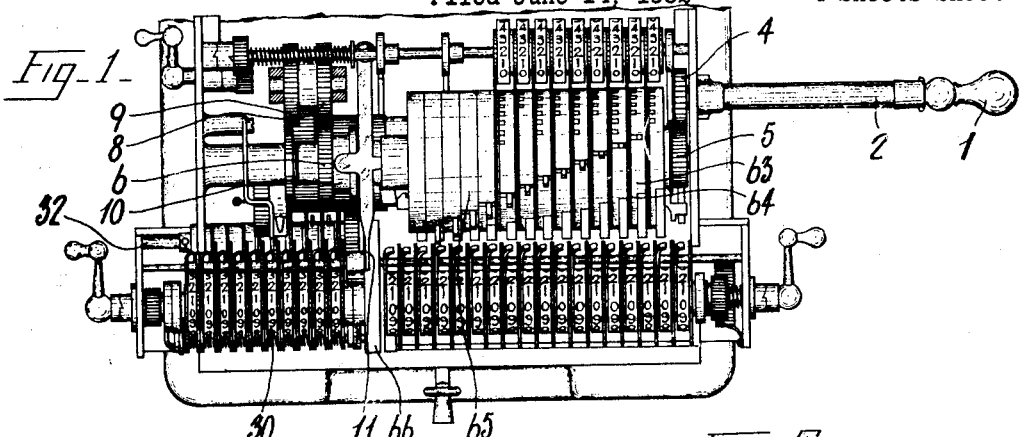
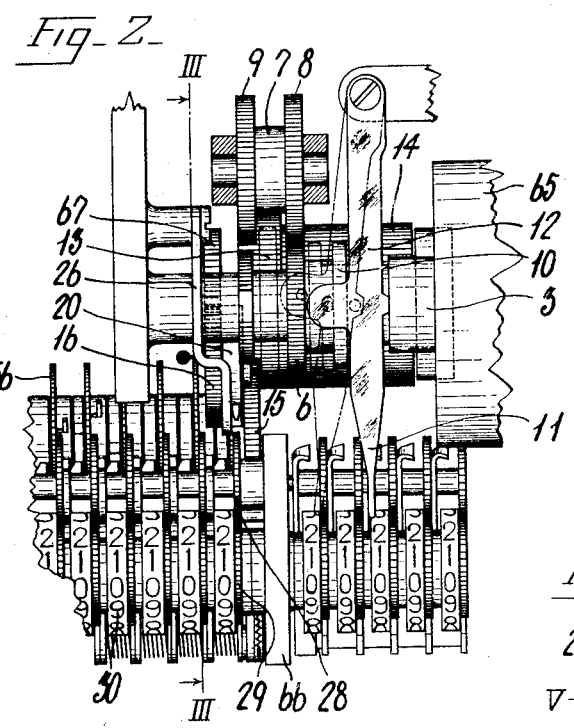
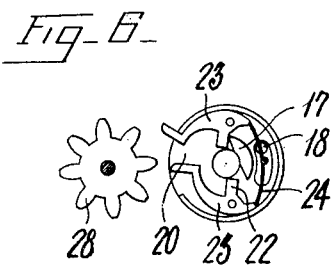
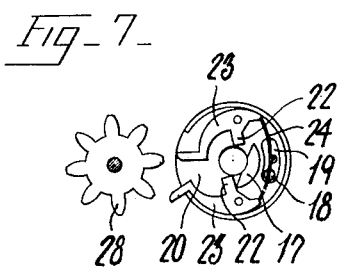
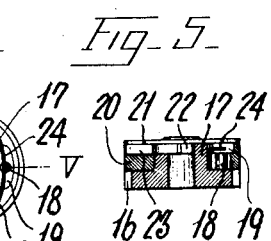
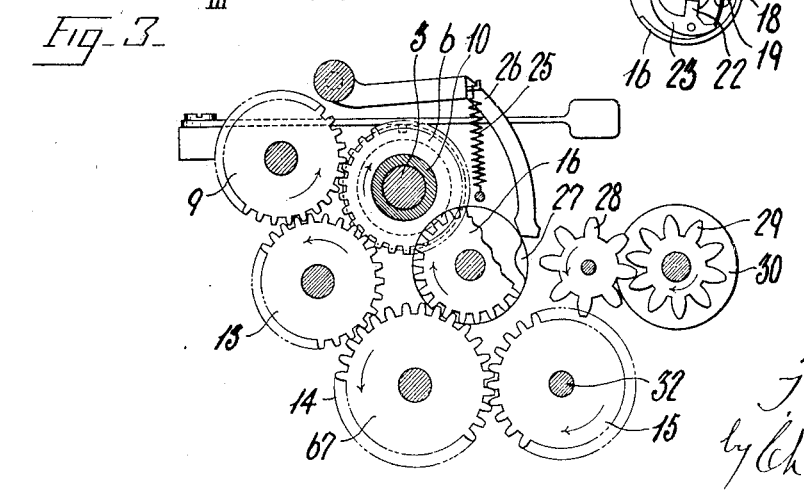

July 20, 1937.  T. OHMOTO  2,087,701

TENS CARRYING MECHANISM

Filed June 14, 1932  4 Sheets-Sheet 2

Inventor,
T. Ohmoto,
by Chas. Williamson
Atty

July 20, 1937.  T. OHMOTO  2,087,701
TENS CARRYING MECHANISM
Filed June 14, 1932  4 Sheets-Sheet 3
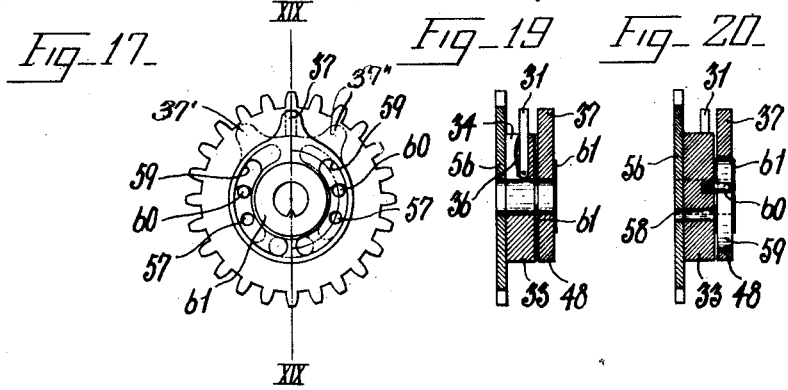
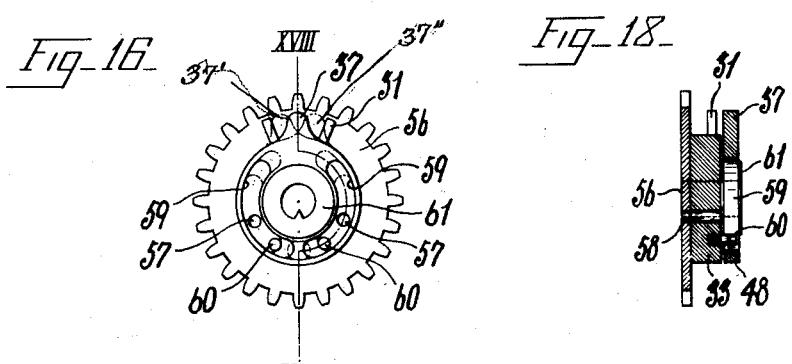
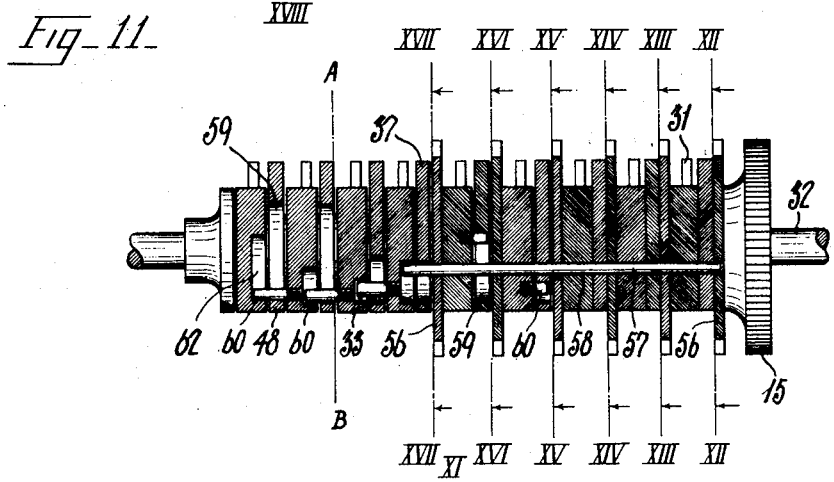
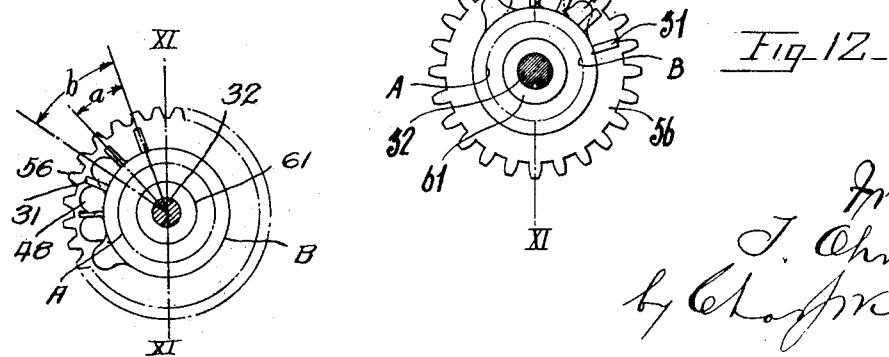
Inventor,
T. Ohmoto
by Chas. J. Williamson
Atty July 20, 1937.   T. OHMOTO   2,087,701
TENS CARRYING MECHANISM
Filed June 14, 1932   4 Sheets-Sheet 4
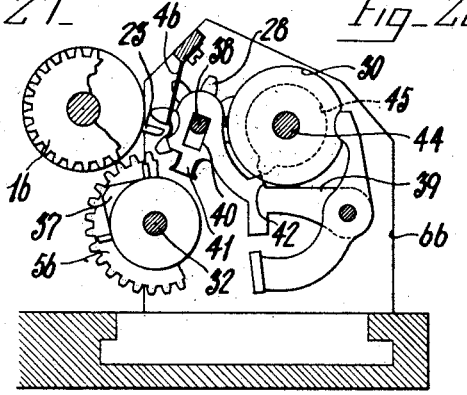
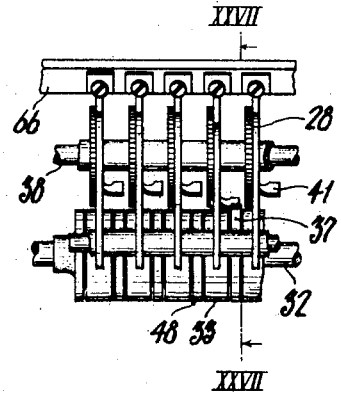
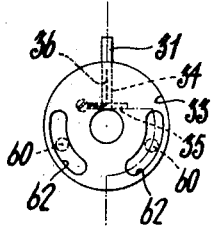
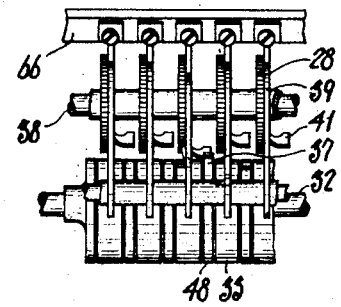
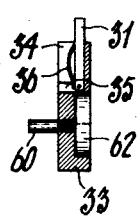
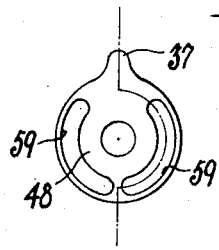
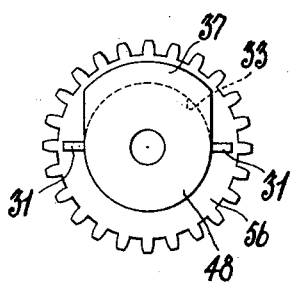
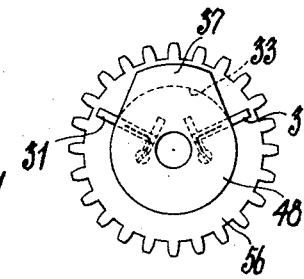
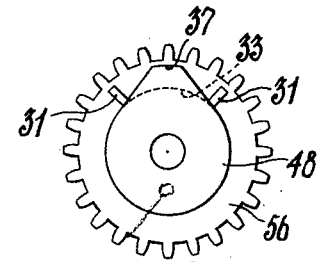

Patented July 20, 1937

2,087,701

UNITED STATES PATENT OFFICE 2,087,701

TENS CARRYING MECHANISM

Torajiro Ohmoto, Nishiyodogawaku, Osaka, Japan

Application June 14, 1932, Serial No. 617,224

15 Claims. (Cl. 235—138)

This invention relates to transfer mechanism for the multiplier registers of calculating machines for use in performing problems in addition, subtraction, multiplication and division.

The object of the invention is to provide an improved transfer mechanism of small size, so that a compact calculating machine of small size can be produced.

Calculating machines provided with tens carrying devices for the multiplier registers are known. In this type of machine the transfer wheels must be of large diameter, in case the register may have to deal with a large number of figures, so that the size of the machine is increased correspondingly. This drawback is eliminated by means of this invention, since the new tens carrying device can be located in a very small space as the diameter of the transfer wheels is considerably reduced.

According to the invention, the transfer mechanism consists of an assembly of three sets of transfer wheels, fixed, intermediate and movable.

In one preferred form of transfer mechanism in accordance with the invention the fixed set comprises three wheels each with transfer teeth and a cam disc with the cam positioned between said teeth, the interval between the teeth decreasing successively from one wheel to the next one higher in order. The intermediate set comprises two transfer wheels, one being provided with a pair of transfer teeth and a movable cam disc and the other with one transfer tooth and a movable cam disc. The movable set comprises four transfer wheels, each being provided with one transfer tooth and a pair of pins and grooves and a cam disc having a pair of slots.

A calculating machine comprising transfer mechanism in accordance with the invention is illustrated by way of example in the accompanying drawings, in which:—

Fig. 1 is a plan of a calculating machine provided with the actuating device according to the present invention with the top-plate removed.

Fig. 2 is an enlarged plan of the left-hand portion of Fig. 1.

Fig. 3 is a part sectional side elevation on the line III—III of Fig. 2.

Fig. 4 is a side elevation of the tooth housing by which the dial is turned by a digit, with the top-plate removed.

Fig. 5 is a sectional elevation on the line V—V of Fig. 4.

Figs. 6 and 7 are each a side elevation of the tooth housing shown in Fig. 4, showing the action of the keys in it.

Fig. 11 is a sectional elevation on the line XI—XI of Fig. 12, an elevation on the line XI—A—XI on the left-hand side of the line A—B and on the line XI—B—XI on the right-hand side of the line A—B.

Fig. 12 is an end elevation of Fig. 11.

Fig. 12a is a view similar to Fig. 12 that illustrates the pitch of the transfer teeth of adjacent transfer wheels and the pitch of a transfer tooth of a transfer wheel and the associated cam.

Figs. 13-15 are sectional elevations of fixed carrying wheels on the lines XIII—XIII, XIV—XIV and XV—XV of Fig. 11 respectively.

Figs. 16-17 are sectional side elevations of intermediate carrying wheels on the lines XVI—XVI and XVII—XVII of Fig. 11 respectively.

Fig. 18 is a sectional elevation on the line XVIII—XVIII of Fig. 16.

Fig. 19 is a sectional elevation on the line XIX—XIX of Fig. 17.

Fig. 20 is a sectional elevation along the slit of Fig. 17.

Fig. 21 is a side elevation of a tooth-housing of movable carrying wheel.

Fig. 22 is a longitudinal sectional elevation along the slit of same.

Fig. 23 is a side elevation of a cam disc of a movable carrying wheel.

Fig. 24 is a longitudinal sectional elevation along the slit of same.

Fig. 25 is an elevation showing the arrangement of movable carrying wheels and the pawl, when the fourth dial from the left shows 0 and is about to be carried to the third dial.

Fig. 26 is an elevation showing the arrangement, when the third dial shows 0 and is about to be carried to the second dial.

Fig. 27 is a sectional side elevation on the line XVII—XVII of Fig. 25, showing the pawl lowered.

Figure 8:
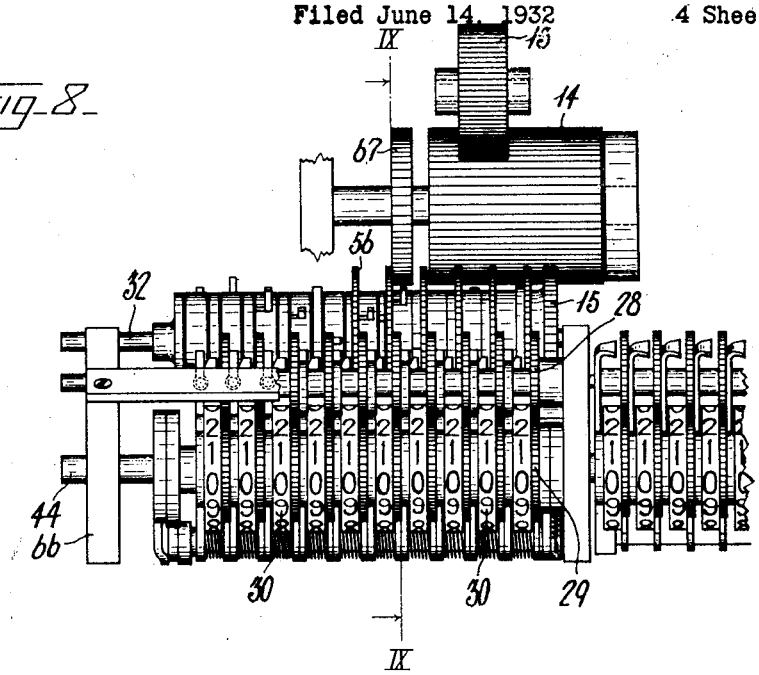
Fig. 8 is an enlarged plan of the left portion of the carriage.

In the upper rear portion of the frame mounted on the main shaft 3 is a rotor 65 composed of a plurality of rotor discs 64 and cam plates 63. A gear 5 secured to said main shaft 3 meshes with a gear 4 on the crank shaft 2, so that the rotor can be revolved by turning the handle. The carriage 66 is the movable front portion of the machine and contains two registers, the right-hand one called the "product" or "dividend" register and the left-hand one called the "multiplier" or "quotient" register.

Slidably mounted on the main shaft 3 is a collar 10 provided with a gear 6 which meshes with a gear 8 connected with a gear 9 by the boss 7 on the same shaft. The collar 10 is slidable in either direction along the shaft 3 by a lever 12 provided with a handle 11. On setting the lever to the right as shown in Fig. 2 the gear 6 comes to mesh with the gear 8 and when the lever takes its left position, shown in a chain line, the gear 6 engages with a gear 13 which is in mesh with the gear 9. The gear 13 meshes with a toothed wheel 14 which in turn meshes with a wheel 15. Secured to the shaft of the gear 14 is a gear 67 which has the same diameter as the gear 14 and meshes with the gear 16 (Fig. 3). Consequently on rotating the handle once in either direction the gears 6, 15, and 16 will each make one revolution.

The gear 16 is provided on one side with a stud 17 segmental in section and a pin 18 which engages in an arcuate slot 19 formed in one side of a tooth housing 20 covered with a plate 21 and mounted on the same shaft (Figs. 4 and 5). Within the housing a pair of teeth 23, each having a projection 22, are pivoted oppositely, the inner ends of said teeth being pressed into contact with the stud 17 of the gear 16 by a spring 24 so as to keep the outer ends of the teeth within the housing (Fig. 4). The housing is locked in position by a lock pawl 26 under the action of spring 25 (Fig. 3) which seats its lower end in a recess 27 formed in the periphery of the housing, when the handle is at its starting or neutral position. Two teeth are used because, as has been explained, gear 16 at different times rotates in opposite directions and in one direction of rotation one tooth is active and in the other direction, the other tooth is active. Since but one tooth at a time is to operate, they are made retractable within the housing so that only one at a time may project therefrom.

In working any calculation in addition or multiplication on the machine the gear 6 is brought into mesh with the gear 8 as shown in Fig. 2 and the handle is turned once in the plus direction, when the gears 6, 8, 9, 13, 14, 67, 15 and 16 make each one rotation in the direction shown by arrows respectively (Fig. 3). The housing being locked in position by the pawl 26 does not begin rotating until the pin 18 of the gear 16 comes in contact with the lower end of the slot 19 made in the housing and drives it, when the pawl is disengaged out of the recess against the tension of the spring 25. But before the pin 18 begins to drive the housing with the gear 16 the stud 17 of said gear comes to press on the projection 22 of the tooth 23 which is the lower one of Fig. 7 lying in the path of rotation, whereby said tooth 23 is swung about its axis, so that its outer end will project beyond the housing, while the outer end of the other tooth is kept within the housing by the action of the spring 24 (Fig. 6). When the handle is turned in the minus direction the direction of rotation of the gear is reversed and the other tooth is projected in just the same manner (Fig. 7). Therefore, each time the housing makes one rotation with the gear 16 the end of one tooth will be projected out of the housing once, said end engaging the gear 28 provided with eight teeth and making it rotate one tooth. As the register dial 30 is provided on its side with a gear 29 having ten teeth which is in mesh with the gear 28, one revolution of the crank shaft in either direction will make the register dial marked with ten numerals 0 to 9 rotate one digit. When the handle is turned in the plus direction eight times the numeral 8 appears on the dial. If by an error the handle has been turned too far by one digit, the dial will register 9. This mistake may be corrected by a turn in the minus direction, when the gear 29 will make a reverse movement one tooth and the dial will be moved backwards one digit.

For subtraction and division the lever 12 is set in the left position, which brings the gear 6 into direct engagement with the gear 13, and the handle is turned in the minus direction, when the gear 13 is rotated in the same direction as before, so as that the dial turns from 0 to 9.

In this manner the handle may be turned in one direction only, in either plus or minus direction during a calculation, according as calculations in addition and multiplication, or in subtraction and division are to be worked, as the dial can be rotated in one direction by a simple adjustment of a lever. By this arrangement errors arising from complicated manipulations of the handle by turning in plus and minus directions during a calculation may be completely avoided and accuracy necessary in a calculating machine may be fully maintained.

By combining this actuating device for the multiplier register dial with tens carrying members any calculation of a large number of figures may be effected with ease and accuracy.

Figure 10:
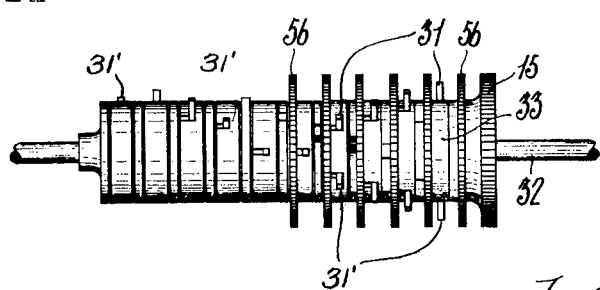
Fig. 10 is a plan of tens carrying wheels.

Now I shall fully explain a tens carrying device used in connection with this invention. The tens carrying mechanism shown in Figs. 10–12 comprises an assembly of three sets of transfer wheels. These sets are designated fixed, intermediate and movable and are located respectively from right to left on shaft 32 in these figures. The transfer wheels are all mounted revolvably on a shaft 32 to which the gear 15 is secured which meshes with the gear 14. In the drawings a tens carrying device for calculation up to ten figures is shown by way of example, as it is only necessary to increase properly the number of wheels for the sum of more than ten figures.

The fixed set comprises three wheels 33 of lower denominations each provided with a pair of transfer teeth 31 and a cam disc 48 arranged on one side of the wheel 56, as shown in Figures 10–15. The wheels are fixed in position relatively to one another, a cam disc being fixed to each wheel.

The intermediate set comprises two wheels of intermediate denominations arranged on one side of the fixed wheels (Figures 10, 12, 16–20). The first intermediate transfer wheel 33 has a pair of transfer teeth 31 and 31' and is provided on one side with a pair of pins 60 which engage in a pair of arcuate slots 59 concentric with the axis of the shaft 32 and formed on each side of the cam disc. Between the transfer wheel and cam disc a washer 61 fixed in position relatively to the shaft by a triangular projection is interposed so that synchronous rotation by friction of the wheel and cam disc is prevented.

The second intermediate transfer wheel is of similar construction to the first one, the only difference being that this wheel is provided with only one transfer tooth and the pin 60 is set higher in position as compared with that on the first wheel, so as to maintain the clearance required between the transfer tooth and the cam.

In the case of intermediate wheels the cam is rotatable to a certain extent in either direction relatively to the wheel, while the wheels are fixed in position relatively to the fixed wheels.

The movable set comprises four wheels 33 of higher denominations arranged on one side of the intermediate wheels. (Figures 10, 12, 21–24). Each of the transfer wheels is provided with one transfer tooth and has on one side a pair of pins 60 and a pair of grooves 62 on the opposite side. The cam disc is provided with a pair of arcuate slots 59 concentric with the axis of the shaft 32. The pin of the first transfer wheel extends through the slot 59 of the second cam disc and engages in the groove 62 of the second transfer wheel. The groove 62 is concentric with the axis of the shaft 32 and shorter in length than the slot 59. The second wheel engages with its pins in the grooves of the third wheel in a similar manner, and so on. The fourth wheel at the extreme left-hand end has no pins.

In the case of the movable wheels the cam is movable to a certain extent in either direction relatively to the wheel and the wheels are also movable in either direction relatively to one another, as well as to the fixed, and to the intermediate wheels. The transfer tooth is held in position in a groove 34 by a spring 36 and hinged at its lower end by a joint 35. The transfer tooth in each of the other sets of transfer wheels is similarly mounted.

Referring particularly to Figs. 11, 16 to 20 inclusive, a pair of horizontal fixing rods 57 secured to the extreme right-hand gear 56 extend through a pair of holes 58 made in each fixed carrying wheel, keeping them in position. The said rods further extend through a pair of slits in the cam disc and a pair of holes 58 in the transfer disc of each intermediate carrying wheel and finally through a pair of slots 59 of the cam disc of the extreme right-hand movable carrying wheel, engaging with its end in a pair of grooves 62 of the transfer disc of said wheel. In this manner each fixed carrying wheel and the transfer disc of each intermediate wheel is fixed in respect to the extreme right-hand gear 56 by means of said horizontal rods, while the cam discs of the intermediate wheels are movable. In the case of the movable carrying wheel the transfer disc and cam disc are movable in respect to said gear 56 and also to each other. The use of a plurality of gears 56 is to make one of them mesh with the gear 14, when the carriage is moved to the right and the gear 15 is disengaged from the gear 14.

On rotation of the gear 15 in a clockwise direction all fixed wheels with their cam discs and intermediate wheels commence rotating at once as a whole body. The cam disc of the first intermediate wheel remains at first stationary and does not begin to rotate, until the right-hand pin 60 secured to the transfer disc comes in contact with the lower end of the slot 59 of the cam disc (Fig. 16). The movement of the cam disc of the second intermediate wheel is similar, but in this case as the pin 60 is positioned higher, the cam disc begins to rotate after the first cam disc has moved for some time. In the case of first movable carrying wheel the transfer disc is first turned by the horizontal rod which engages with its end in the groove 62 and then the cam disc is rotated by same rod. The second wheel is driven in just the same manner by the pin attached on one side of the first transfer disc, and so forth. Therefore the transfer tooth is always followed by the cam in movement with a certain clearance between them, when the handle is turned in either direction.

Figure 9:
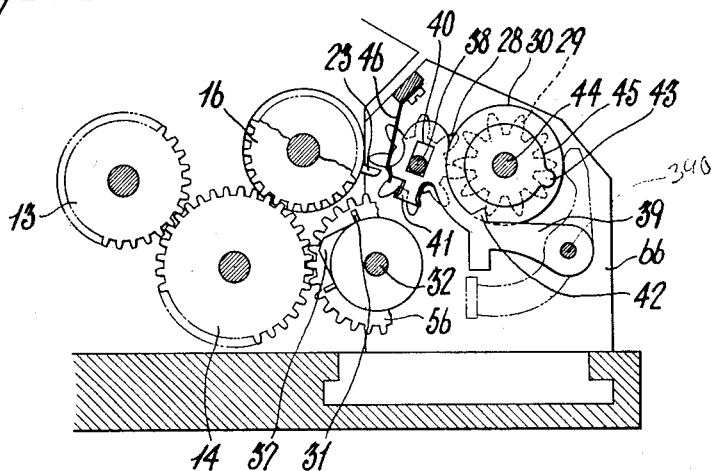
Fig. 9 is a part sectional elevation on the line IX—IX of Fig. 8.

The shaft 38 (see Figs. 9 and 27) of the gear 28 passes through a rectangular hole 40 formed in the upper end of a pawl 39 revolvably mounted on a shaft 390 secured to the frame. The pawl 39 is provided just below said hole with a catch 41 with its end bent laterally and a projection 42 in the upper middle portion. Mounted on the shaft 44 on one side of the multiplier register dial 30 is a cam disc with a cam 43 which is rotatable by a gear 29 secured on the opposite side of the dial to same shaft. The catch 41, when lowered lies in the path of rotation of corresponding transfer tooth and cam. On rotation of the cam disc 45 the projection 42 is pressed downwards by the cam 43 and the pawl is lowered as shown in Fig. 27. At this instant the units dial shows 0. The transfer tooth 31 of tens carrying wheel which is in rotation, when coming in contact with the catch, is pressed to the left and engages the gear 28 next in order, turning it one tooth, whereupon the cam 37 on coming in contact with the catch presses it upwards and the pawl is reset in its original position. The pawl is held locked in position by a spring 46. The cam is to be positioned in such a manner that when the figure 0 appears in a dial the pawl of next dial is lowered. In other words, on turning the handle ten times a dial shows successively 0 to 9 and on moving from 9 to 0 by a further turn of the handle the dial next in order is to be rotated from 0 to 1.

In the case of the fixed and intermediate wheels which are provided with a pair of transfer teeth, one transfer tooth 31 actuates when rotated in the plus direction and the other 31' actuates in the minus direction. The transfer tooth of the second intermediate wheel and those of the movable wheels always participate in the action regardless of the direction of revolution. In the practical example shown in the drawings the transfer teeth 31 of the first fixed wheel are mounted diametrically opposite to one another so as to make either of the teeth actuate accordingly as the handle is turned a quarter of a revolution in either direction.

The clearance between one transfer tooth and the next one, i. e. the pitch of the tooth must be equal to or greater than the pitch of the tooth of the gear 29. The clearance between the transfer tooth and the cam should also be definite. In the case of the intermediate transfer disc with a pair of teeth the interval between the two teeth becomes so small that this clearance between the tooth and cam cannot be maintained when the cam disc is fixed between the teeth and therefore in order to keep the clearance required between the tooth and cam, the latter is made movable in either direction. The second cam disc co-operating with the transfer disc with one tooth must be movable in either direction for the same reason, but as this cam disc is to be rotated lagging by one pitch after the first cam disc, the pin 60 of the tooth disc is positioned higher (Figs. 16–17). The length of the slot 59 of a cam disc of the movable carrying wheel is to be equal to twice the pitch of the gear 29.

On rotation of the tens carrying device in the plus direction the tooth of the extreme right-hand fixed wheel begins first to turn and then the second and third successively, ending with the tooth of the extreme left-hand movable wheel, keeping the interval of one pitch, while rotated in the minus direction the operation is just reversed, commencing with the tooth of the extreme left hand movable wheel.

For a multiplier register designed for calculations up to ten figures nine sets of carrying wheels are required, as there is no need for the tenth figure to be carried. When all wheels are fixed it is impossible to set a pair of teeth on each wheel with a given pitch between a tooth of a wheel and that of the next one, unless the wheel is made larger in diameter, because the path of one series of teeth comes to cross with the other, when a wheel of small diameter is used. In case carrying wheels with large diameter are used other corresponding parts of the machine must be correspondingly made larger. This disadvantage is removed completely in this invention by the use of my tens carrying device.

I claim:

1. Transfer mechanism for a calculating machine comprising an assembly of sets of transfer wheels side by side, one set being rotatable as a group, and another rotatable individually, said wheels including radially extending transfer teeth, and means to set the transfer teeth in a spiral line.

2. Transfer mechanism for a calculating machine comprising an assembly of sets of side by side transfer wheels, there being a set of fixed wheels that includes three transfer wheels, a pair of transfer teeth for each wheel, and a cam disc with the cam positioned between said teeth, the intervals between the teeth decreasing successively from one wheel to the next one higher in order.

3. Transfer mechanism for a calculating machine comprising an assembly of three sets of transfer wheels in axial alinement, one set being an intermediate set and comprising two transfer wheels, one having a pair of transfer teeth and a rotatable cam disc and the other having one transfer tooth and a rotatable cam disc.

4. Transfer mechanism for a calculating machine comprising an assembly of three sets of transfer wheels in axial alinement, one end set comprising four transfer wheels, each with one transfer tooth and a pair of pins and grooves and a cam disc having a pair of slots.

5. Transfer mechanism for a calculating machine comprising an assembly of three sets of transfer wheels in axial alinement, each set having a wheel with an axially movable transfer tooth, situated in a groove formed on one side of the transfer wheel, and a spring yieldingly holding said tooth at one limit of its axial movement.

6. Transfer mechanism for a calculating machine comprising an assembly of three sets of transfer wheels in axial alinement, each of the transfer wheels of each set having at one side a cam disc with a cam that follows the transfer tooth of the wheel in rotation with a constant clearance.

7. A tens carrying device for a calculating machine comprising transfer mechanism including a plurality of sets of transfer wheels, means for rotating one of said sets of transfer wheels as a group and means for rotating the wheels of another set individually.

8. A tens carrying device according to claim 7, in which the set of wheels rotatable as a group comprises three transfer wheels, each wheel being provided with two transfer teeth and a cam disc positioned between said teeth.

9. A tens carrying device according to claim 7, in which the individually rotatable wheels are provided with one transfer tooth, laterally projecting pins and a cam disc with pin engaging slots therein.

10. Transfer mechanism for a calculating machine comprising an assembly of three sets of transfer wheels of different denominations having laterally displaceable teeth and provided with cams, the wheels of the lower denominations being fixed relatively to one another and to the cams, the wheels of the intermediate denominations being fixed relatively to one another and to the former wheels while their cams are relatively movable to a certain extent in either direction and the wheels of the higher denominations being movable relatively to one another and to the wheels of the other denominations while their cams are also movable relatively to these wheels.

11. Transfer mechanism as claimed in claim 10, in which the set of wheels of lower denominations comprises three transfer wheels, each of which is provided with a pair of transfer teeth and a cam disc with the cam positioned between said teeth, the interval between the teeth decreasing successively from one wheel to the next one higher in order.

12. Transfer mechanism as claimed in claim 10, in which the set of wheels of intermediate denominations comprises two transfer wheels, one being provided with a pair of transfer teeth and a movable cam disc and the other with one transfer tooth and a movable cam disc.

13. Transfer mechanism as claimed in claim 10, in which the set of wheels of higher denominations comprises four transfer wheels, each of which is provided with one transfer tooth and a pair of pins and grooves and with a cam disc having a pair of slots, the pins of one wheel extending through the slots in the next cam disc and engaging in the groove in the next wheel.

14. Transfer mechanism as claimed in claim 10, in which each transfer tooth of each of the transfer wheels is held in position in a groove formed on one side of the transfer wheel by a spring and is pivoted at its lower end, the transfer tooth of the wheel of next higher denomination being successively displaced by one pitch.

15. Transfer mechanism as claimed in claim 10, in which the clearance between the teeth and cams of the transfer wheels is constant.

TORAJIRO OHMOTO.